R. A. FESSENDEN.
STOP CLOCK.
APPLICATION FILED AUG. 10, 1920.
1,397,950.
Patented Nov. 22, 1921.
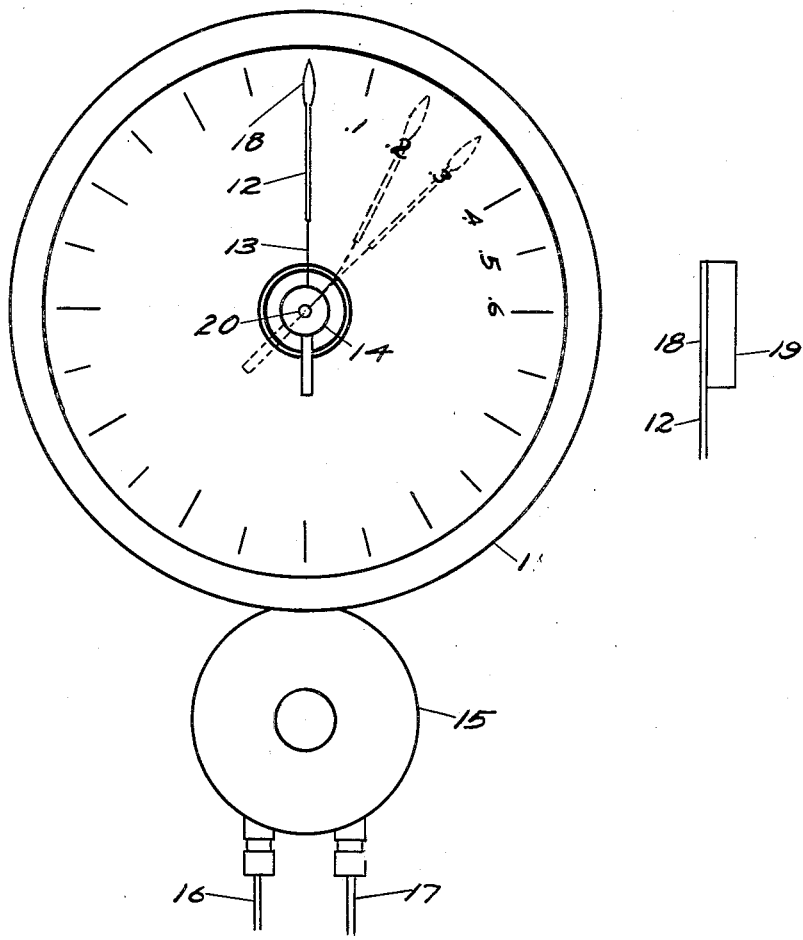
WITNESSES:
INVENTOR.

UNITED STATES PATENT OFFICE.

REGINALD A. FESSENDEN, OF CHESTNUT HILL, MASSACHUSETTS, ASSIGNOR TO SUBMARINE SIGNAL COMPANY, OF PORTLAND, MAINE, A CORPORATION OF MAINE.

STOP-CLOCK.

1,397,950.   Specification of Letters Patent.   Patented Nov. 22, 1921.

Application filed August 10, 1920. Serial No. 402,661.

*To all whom it may concern:*

Be it known that I, REGINALD A. FESSENDEN, of Chestnut Hill, in the county of Middlesex and State of Massachusetts, a citizen of the United States, have invented new and useful Improvements in Stop-Clocks, of which the following is the specification.

My invention relates to the measurement of small intervals of time and has for its object the more efficient and accurate measurement of such intervals and rendering such small intervals of time visible simultaneously to a plurality of observers or to an observer at a distance.

The figure shows partly diagrammatically apparatus adapted for carrying out my invention.

Heretofore in the art the measurement of small intervals of time has been accomplished by chronographs, stop watches, and the like, but the commercial instruments for this purpose have not been adapted to display the measurements simultaneously to a number of observers or to an observer at a distance from the indicating mechanism.

Applicant, being desirous of obtaining an indicator adapted to display the indication simultaneously to a plurality of observers or to an observer at a distance, entered into communication with the principal manufacturers of stop watches and similar time recording apparatus both in this country and in Europe, but was informed that no such instrument existed and that the manufacturers were unwilling to undertake the manufacture of same and stated that they did not believe same possible of accomplishment.

Applicant therefore devised an apparatus for this purpose having a dial more than a foot in diameter and reading approximately in tenths of seconds, which apparatus, on being constructed, was found to work entirely satisfactorily.

This apparatus involved a number of certain new devices, some of which are disclosed and claimed in the present application and others form the subject of other applications.

In the figure, 11 is the stop clock, 18 is the pointer of the indicating hand attached to the hand 12, which hand is attached by means of the spring 13 to the rotating shaft 20. The rotating shaft 20 may be driven in any of the ways suitable and well known in the art; for example, by a mechanism such as is at present used in stop watches but of larger size, and is started and stopped by the electromagnetic mechanism 15 actuated by currents flowing in through the conductors 16 and 17.

The device 15 is not described or claimed in the present application.

As the result of applicant's experiments, applicant has discovered that by placing a spring 13 between the hand 12—18 and the shaft 20 greater efficiency, accuracy, and economy of driving force are obtained, especially accuracy in starting, and in maintaining the correct speed of rotation of the shaft 20.

In operation, if the spring 13 were not there on starting the mechanism it would be necessary for the driving mechanism to instantaneously set in motion the hand 18—12. As this travels at a high speed, for example three feet in two seconds, this involves considerable difficulties. These difficulties disappear, however, when the spring is used.

For example, suppose that the clock has made two beats and that the hand is now at rest in such position that the pointer indicates .2 (two-tenths) of a second. During the next interval if the attachment between the hand and the shaft 20 were rigid the hand 18—12 would have to be substantially instantaneously set in motion, whereas when the spring 13 is employed all the motion that the shaft 20 has to accomplish instantaneously is the bending of the spring 13, as shown, and during the remainder of the interval the spring 13 forces the hand forward by its own elasticity into the position marked .3. It is not essential to my invention that the hand should only swing to the point .3, as it may swing past it or not quite up to it, but I prefer that it should swing up to it. This I accomplish by making the inertia of the hand and the strength of the spring such that the natural vibration period of the hand and spring combined shall be equal to the time elapsing between each step of the motion.

This has not only the advantage of making the apparatus easier to read but also tends to give greater accuracy of movement, because by making the natural vibration period of the hand synchronous with the vibration period of the driving mechanism, the accuracy of each time movement is found in practice to be improved.

In order that the hand may not swing past the desired point, even when synchronous, it is advisable to have a certain amount of dampening to the motion of the hand. As a rule there will be sufficient dampening in the hand itself due to the motion through the air, but where this is not the case the pointer 18 attached to the shaft 12 is fitted with a thin fin of metal or mica 19, which is so proportioned as to give the desired friction.

By this method—i. e. by giving the hand a natural period—I have found it possible to entirely eliminate the balance wheel of the clock as a regulating device and to regulate the time of motion by the natural vibration period of the hand itself, which I preferably compensate for temperature.

By this means stop clocks reading to one-tenth of a second or even one-hundredth of a second may be constructed with faces three feet or more in diameter and hence visible to a large number of observers simultaneously or at a large distance and electrically stopped and started.

What I claim is:

1. In an apparatus for measuring time intervals, a continuously rotating driving shaft, and an indicating hand, said indicating hand having a natural period of vibration which is a multiple of the time units in which the time intervals are measured.

2. In an apparatus for measuring small intervals of time, a driving shaft, an indicating hand, an elastic connection between said driving shaft and said hand, and a dampening mechanism attached to said hand.

REGINALD A. FESSENDEN.